(12) United States Patent
Klein et al.

(10) Patent No.: US 8,791,672 B2
(45) Date of Patent: Jul. 29, 2014

(54) REGULATED POWER SUPPLY SYSTEM WITH HIGH INPUT VOLTAGE DYNAMICS

(75) Inventors: Francois Klein, Valence Cedex (FR); Christophe Taurand, Valence Cedex (FR)

(73) Assignee: Thales, Neuilly sur Seine (FR)

( * ) Notice: Subject to any disclaimer, the term of this patent is extended or adjusted under 35 U.S.C. 154(b) by 93 days.

(21) Appl. No.: 13/232,212

(22) Filed: Sep. 14, 2011

(65) Prior Publication Data

US 2012/0068679 A1  Mar. 22, 2012

(30) Foreign Application Priority Data

Sep. 16, 2010  (FR) ...................................... 10 03688

(51) Int. Cl.
*G05F 1/613* (2006.01)
*G05F 3/16* (2006.01)

(52) U.S. Cl.
USPC ........... 323/222; 323/223; 323/224; 323/225; 323/271; 323/282; 323/283; 323/284

(58) Field of Classification Search
CPC ...... H02M 3/1582; H02M 3/156; H02M 1/44
USPC ......... 323/222, 224, 225, 271, 282, 283, 284, 323/223
See application file for complete search history.

(56) References Cited

U.S. PATENT DOCUMENTS

| | | | | |
|---|---|---|---|---|
| 5,734,258 A | * | 3/1998 | Esser ............................. | 323/224 |
| 5,831,418 A | | 11/1998 | Kitagawa | |
| 6,037,755 A | * | 3/2000 | Mao et al. ...................... | 323/222 |
| 6,166,527 A | * | 12/2000 | Dwelley et al. ............... | 323/222 |
| 6,191,567 B1 | * | 2/2001 | Sluijs ............................. | 323/259 |
| 6,348,779 B1 | * | 2/2002 | Sluijs ............................. | 323/222 |
| 6,348,781 B1 | * | 2/2002 | Midya et al. ................... | 323/224 |
| 6,737,838 B2 | * | 5/2004 | Sluijs et al. .................... | 323/225 |
| 6,765,371 B2 | * | 7/2004 | Kataoka ......................... | 323/222 |
| 6,788,033 B2 | * | 9/2004 | Vinciarelli ..................... | 323/225 |
| 6,977,488 B1 | | 12/2005 | Nogawa et al. | |
| 6,984,967 B2 | * | 1/2006 | Notman ......................... | 323/282 |
| 7,116,085 B2 | * | 10/2006 | Ikezawa ......................... | 323/225 |
| 7,135,843 B2 | * | 11/2006 | Ikezawa ......................... | 323/282 |
| 7,176,667 B2 | * | 2/2007 | Chen et al. ..................... | 323/282 |
| 7,256,570 B2 | * | 8/2007 | Zhou et al. ..................... | 323/224 |
| 7,365,525 B2 | * | 4/2008 | Zhou et al. ..................... | 323/282 |
| 7,394,231 B2 | * | 7/2008 | Flatness et al. ................ | 323/259 |
| 7,466,112 B2 | * | 12/2008 | Zhou et al. ..................... | 323/259 |
| 7,733,072 B2 | * | 6/2010 | Kanakubo ...................... | 323/271 |

(Continued)

OTHER PUBLICATIONS

J. Chen, et al., Buck-Boost PWM Converters Having Two Independently Controlled Switches, 32nd Annual IEEE Power Electronics Specialists Conference, Jun. 17, 2001, vol. 2, pp. 736-741.

*Primary Examiner* — Bao Q Vu
(74) *Attorney, Agent, or Firm* — McDermott Will & Emery LLP

(57) ABSTRACT

This regulated power supply system with high input voltage dynamics, of the type having a shared inductance buck/boost transformer and having at least two controllable semiconductor switching members, one associated with the buck function of the transformer and the other with the boost function of the transformer, is characterized in that one of the controllable semiconductor switching members is driven by control means as a function of the system's input voltage, and the other is driven continuously by enslavement means on the output voltage.

10 Claims, 13 Drawing Sheets

(56) References Cited

U.S. PATENT DOCUMENTS

| | | | |
|---|---|---|---|
| 8,415,937 B2 * | 4/2013 | Hester | 323/282 |
| 2010/0164449 A1 * | 7/2010 | Dwarakanath et al. | 323/282 |
| 2011/0006743 A1 * | 1/2011 | Fabbro | 323/282 |

* cited by examiner

REGULATED POWER SUPPLY SYSTEM WITH HIGH INPUT VOLTAGE DYNAMICS

CROSS REFERENCE TO RELATED APPLICATIONS

The present application claims priority under 35 U.S.C. §119 to French Patent Application No. 10 03688, filed Sep. 16, 2010, which is incorporated herein by reference.

BACKGROUND

The present invention relates to a regulated power supply system with high input voltage dynamics.

More particularly, the invention relates to a power supply system including a shared-inductance buck/boost transformer and including at least two controllable semiconductor switching members, one associated with the buck function of the transformer and the other with the boost function of said transformer.

It is known that such power supply systems can have three operating modes, i.e. a buck mode, a boost mode, and a buck/boost mode.

These three operating modes then require the use of three different implemented control logics and a switch between these different control logics.

In the state of the art, one for example monitors the voltage difference between the input and output of the power supply system and then chooses the best suited control law. This makes it possible to obtain the desired operation to lower or raise the voltage or to obtain an optimal output.

This solution is already being implemented in commercial power supply systems such as the LINEAR TECHNOLOGY LTC3780 controllers.

However, it has a certain number of drawbacks.

Because there are in fact three operating modes, there are also three implemented control logics. During operation, the system operating only in one of the three modes most of the time, if the control breaks down in one of the other two modes, the breakdown may be hidden. There is then a possibility of having a latent breakdown that is not detected in the nominal operating mode, but that can cause unavailability of the system in certain transitional events.

However, such systems may for example be implemented in aeronautics applications, where one can see that such a drawback can result in major problems.

Furthermore, the logic of going from one control mode to the other is done based on a comparison with hysteresis. This results in several drawbacks, i.e. the operating mode in the transitional areas depends on the progression direction of the input voltage, there is a risk of instability if the hysteresis of the comparison is not great enough, and the discontinuity of the operating mode risks having an impact on the output voltage during the transitional phases.

The aim of the invention is therefore to resolve these problems.

SUMMARY

To that end, the invention relates to a regulated power supply system with high input voltage dynamics, of the type having a shared inductance buck/boost transformer and having at least two controllable semiconductor switching members, one associated with the buck function of the transformer and the other with the boost function of the transformer, characterized in that one of the controllable semiconductor switching members is continuously driven using control means as a function of the system's input voltage, and the other is driven continuously by enslavement means on the output voltage, the control means and the enslavement means of the controllable semiconductor switching members being active in all operating modes of the regulated power supply system.

According to other aspects of the invention, the power supply system comprises one or more of the following features:

the controllable semiconductor switching member driven by the control means as a function of the system's input voltage is the switching member associated with the buck function of the transformer, the controllable semiconductor switching member driven by the control means as a function of the system's input voltage is the switching member associated with the system's boost function, the control means as a function of the system's input voltage use an affine function for controlling the corresponding member, the enslavement means on the input voltage of the other member use an enslavement function on a set point, the enslavement means comprise an analog corrector chosen from the group comprising a P, PI or PID corrector or a digital corrector, the control means of the semiconductor switching members use control means in voltage mode or in current mode, the control means of the semiconductor switching members use positive and/or negative current limiting means, the control means of the semiconductor switching members use means that may or may not be independent, at different or identical frequencies, in phase or out of phase, and the control means use control means by pulse skipping or burst mode.

BRIEF DESCRIPTION OF THE DRAWINGS

The invention will be better understood using the following description, provided only as an example and done in reference to the appended drawings, in which.

DETAILED DESCRIPTION

Figure 1:
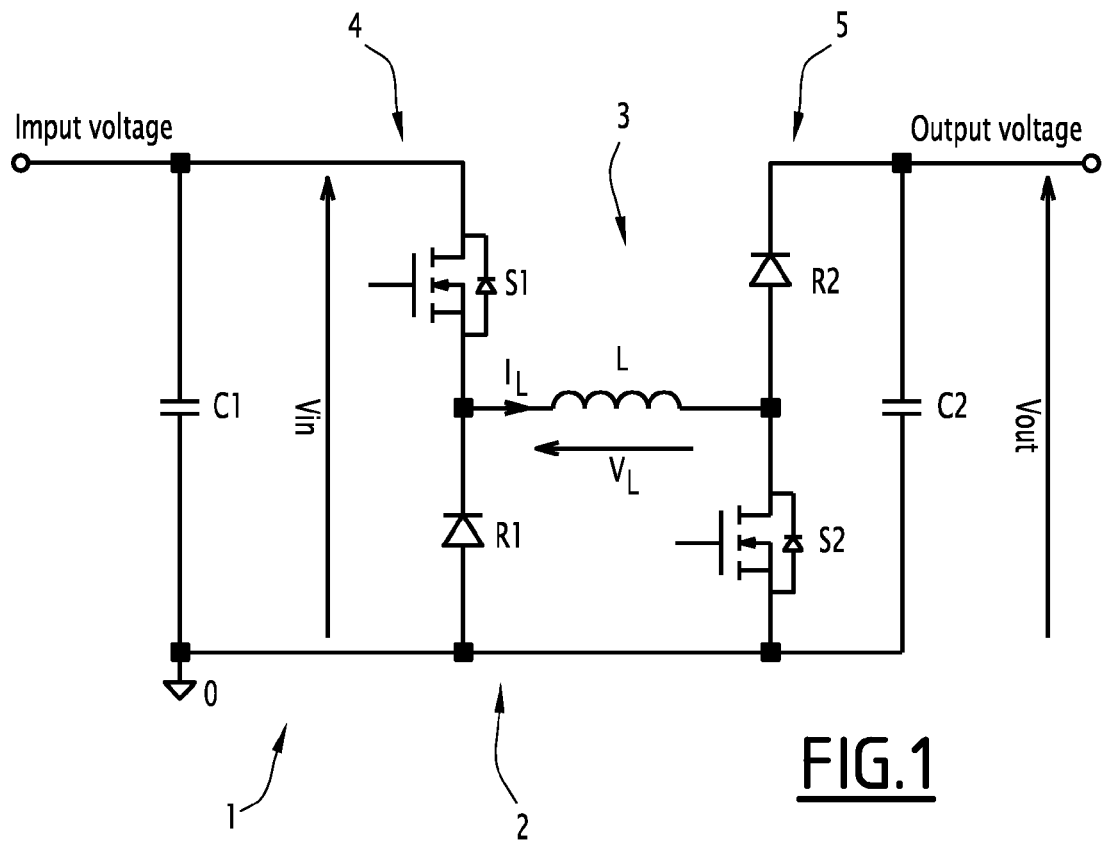
FIG. 1 is an overview diagram illustrating one embodiment of a transformer included in the composition of a power supply system of the state of the art.

FIG. 1 in fact shows an embodiment of a known power supply system, for example a regulated direct power supply system with high input voltage dynamics that is designated by general reference 1 in the figure.

This power supply system is for example applicable in the aeronautics field. It then includes a shared-inductance buck/boost transformer L, the transformer being designated by general reference 2 and the shared inductance L being designated by general reference 3.

This inductance L is connected between the middle points of two branches respectively designated by references 4 and 5 in this figure, each branch including a controllable semiconductor switching member S1 and S2, respectively, for example made up of MOSFET-type transistors and a rectifier R1 and R2, respectively, which can be made up of diodes or controllable semiconductor switching members. Each branch then includes a semiconductor switching member and a rectifier in tandem.

The semiconductor switching member S1 is placed in the upper part of the corresponding branch 4, said branch being connected in parallel with a capacitive component, for example C1, between the input voltage and the zero.

This part of the system makes up the buck part of the transformer,

The controllable semiconductor switching member S2 is placed in the lower part of the branch 5, the rectifier R2 being placed in the upper part of said branch and said branch being connected in parallel with a capacitive component C2 and delivering the system's output voltage. This part of the system makes up the boost part of the transformer.

It will be noted that the capacitive components C1 and C2 are used as input and output filtering means.

Such a transformer is therefore a DC-DC converter of the buck/boost type, known in the state of the art.

There are three main ways of controlling the operation of this structure.

Figure 2:
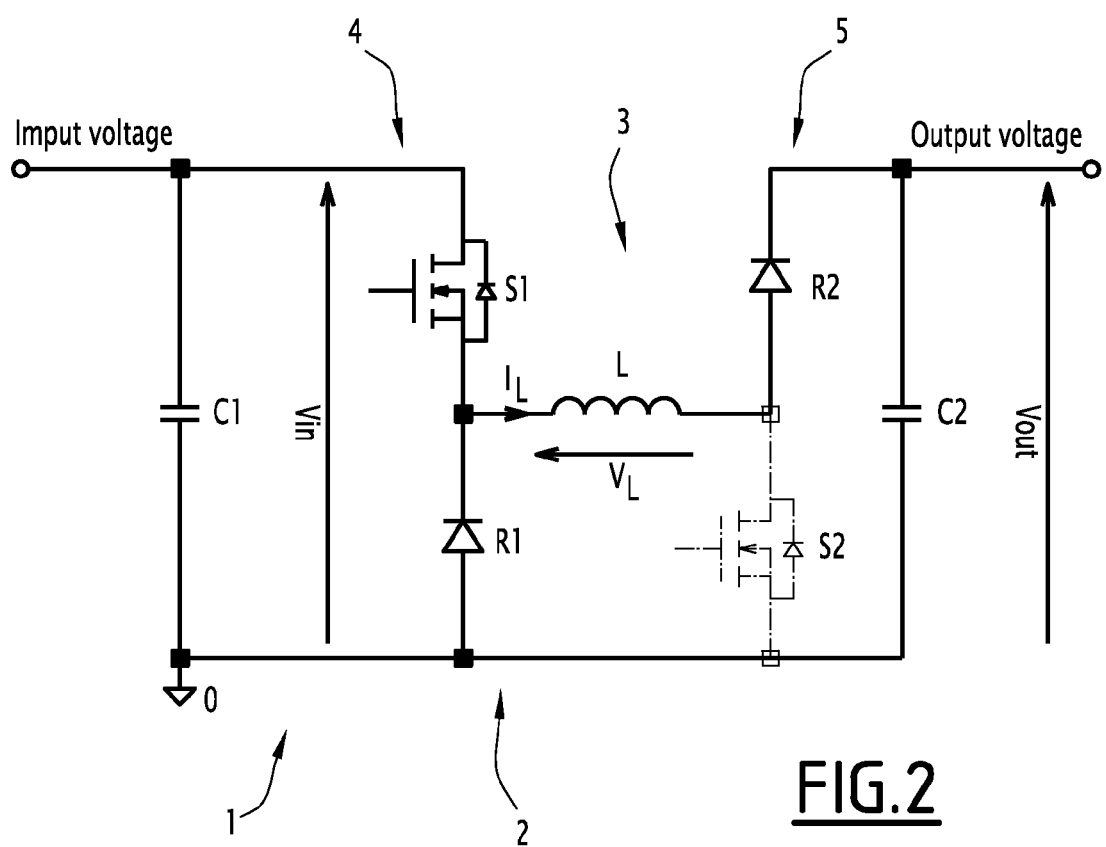
FIGS. 2 to 8 illustrate the operation of such a system in buck mode.

The first consists of controlling it in buck mode. As illustrated in FIG. 2, if one does not control the member S2, it always remains open and the rectifier R2 is continuously conducting. The structure is then a "buck"-type structure. The continuous flow operation of such a structure is broken down into two phases with a total duration called T, chopping period. These two phases are phase α or conduction phase, and phase β or free-wheeling phase.

Figure 3:
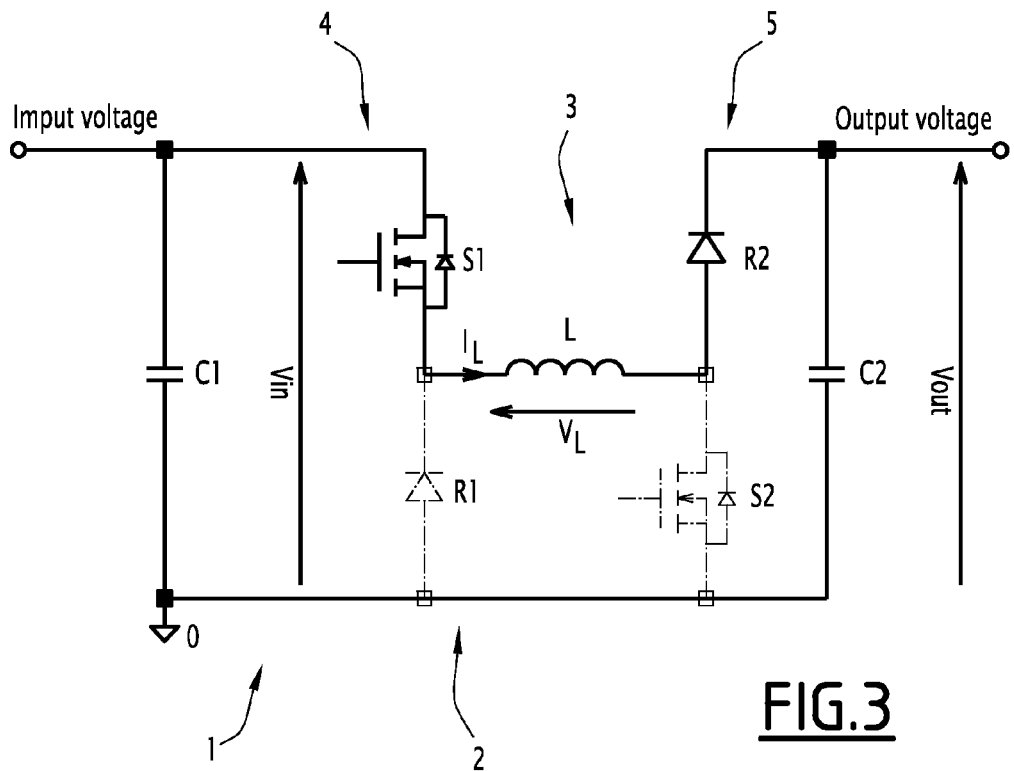

In phase α or the conduction phase illustrated in FIG. 3, the member S1 conducts electricity, forcing the voltage at the terminals of the inductance L to the value $V_L = V_{in} - V_{out}$.

Figure 4:
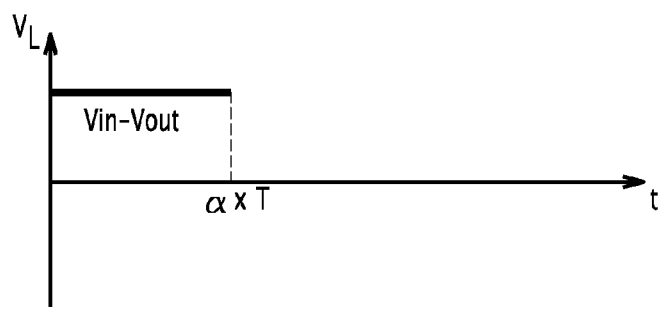
Figure 5:
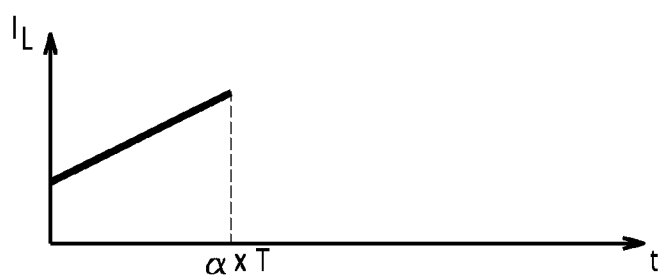

This voltage being positive, the current in the inductance increases linearly as a function of time, as illustrated in FIGS. 4 and 5.

Figure 6:
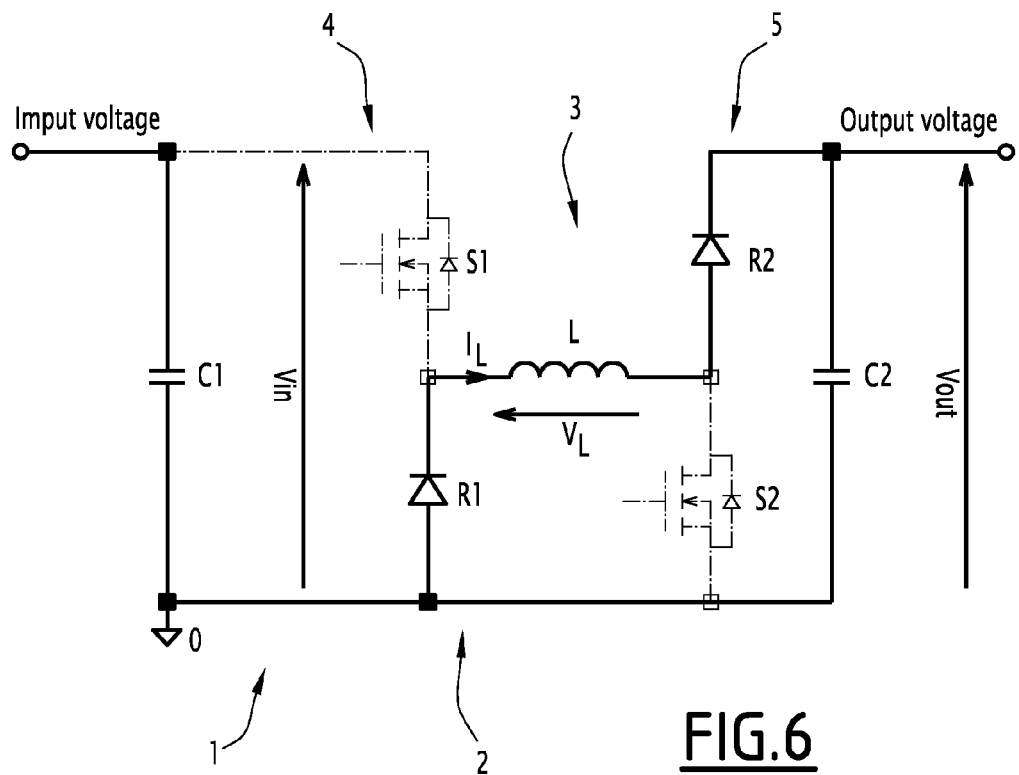
Figure 7:
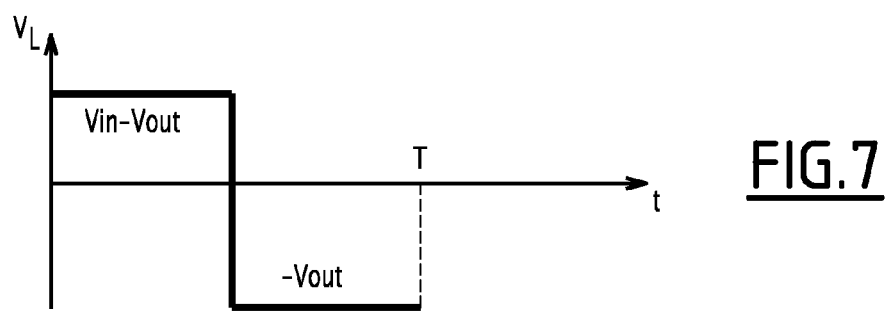
Figure 8:
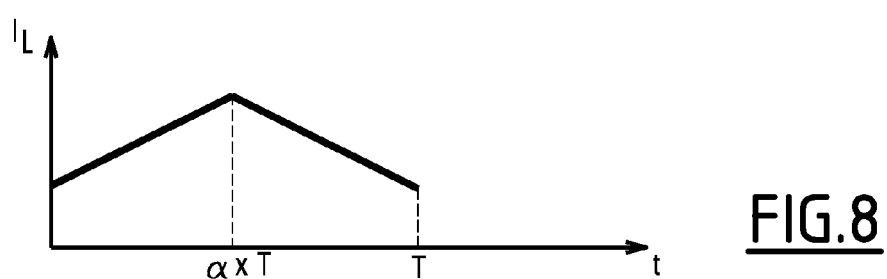

In phase β or the free-wheeling phase, the member S1 opens, as illustrated in FIG. 6, Preventing any current discontinuity in the inductance, the rectifier R1 becomes conductive. The voltage at the terminals of the inductance L becomes negative, thereby causing the current passing through it to decrease, as illustrated in FIGS. 7 and 8.

If $\alpha_{buck}$ refers to the cyclic control ratio of the member S1, we then have the following relationship between the output voltage and the input voltage: $V_{out} = \alpha_{buck} V_{in}$.

The transformer then lowers the input voltage.

The second embodiment of this system corresponds to the "boost" mode.

Figure 9:
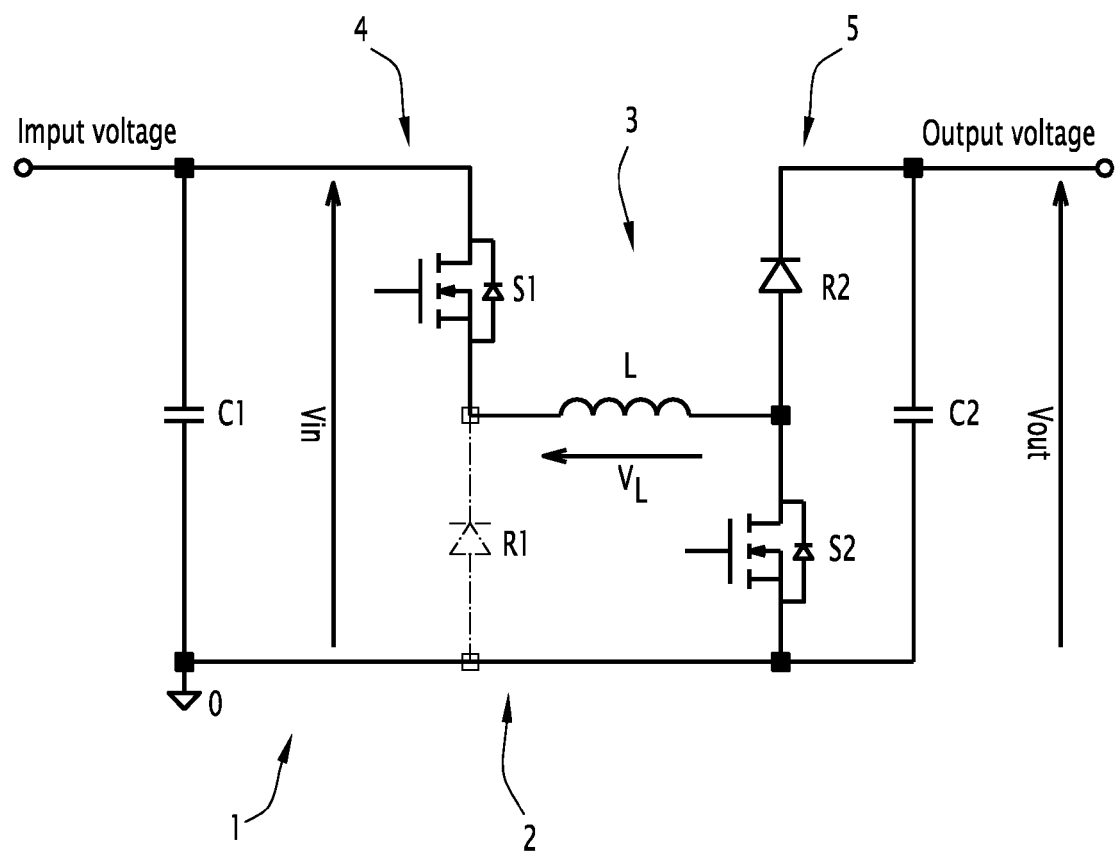
FIGS. 9 to 15 illustrate the operation of said system in boost mode.
Figure 10:
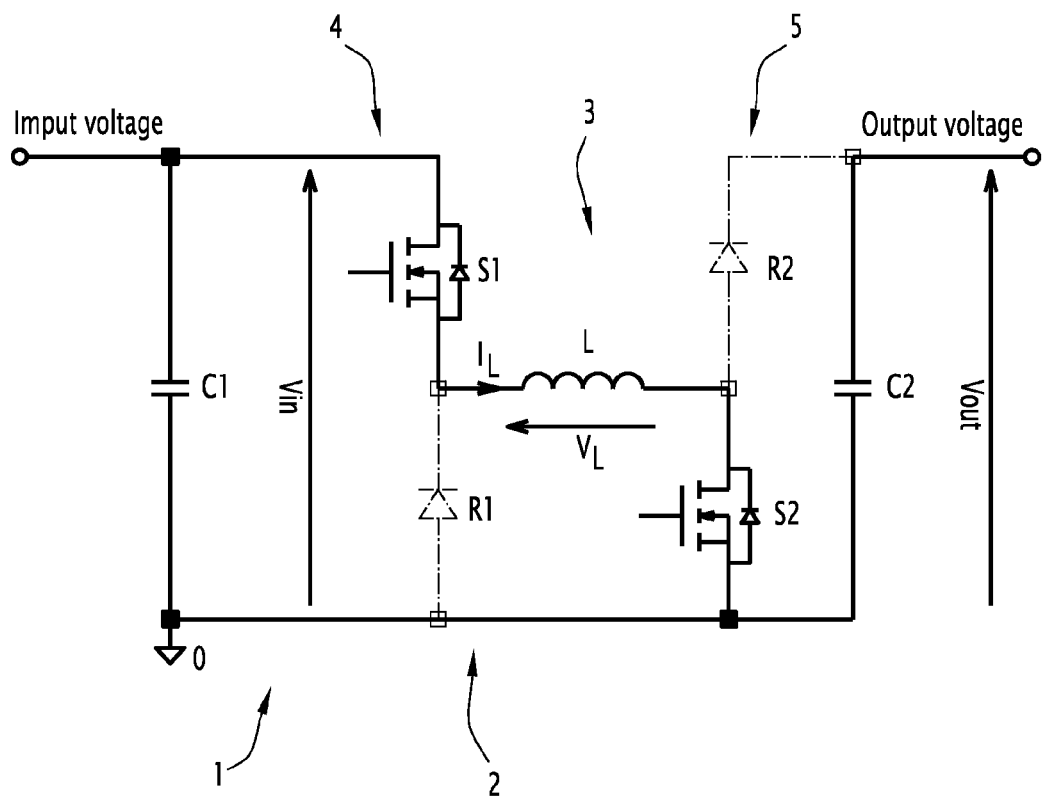

As illustrated in FIG. 9, if the member S1 is always controlled, it remains conductive and the rectifier R1 remains continuously blocked. The structure is then a so-called "boost" structure. The continuous flow operation of such a structure is also broken down into two phase with a total duration called T, chopping period. The first phase is a phase α or charge phase and the second phase a phase β or free-wheeling phase. As illustrated in FIG. 10, in phase a or the charge phase, the switch S2 conducts, forcing the voltage at the inductance terminals L to the value $V_L = V_{in}$.

Figure 11:
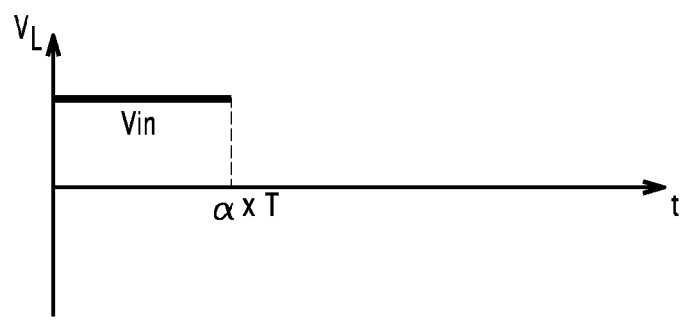
Figure 12:
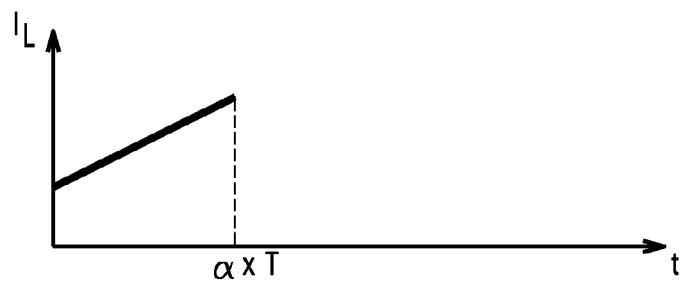

This voltage being positive, the current in the inductance L increases linearly as a function of time, as illustrated in FIGS. 11 and 12.

Figure 13:
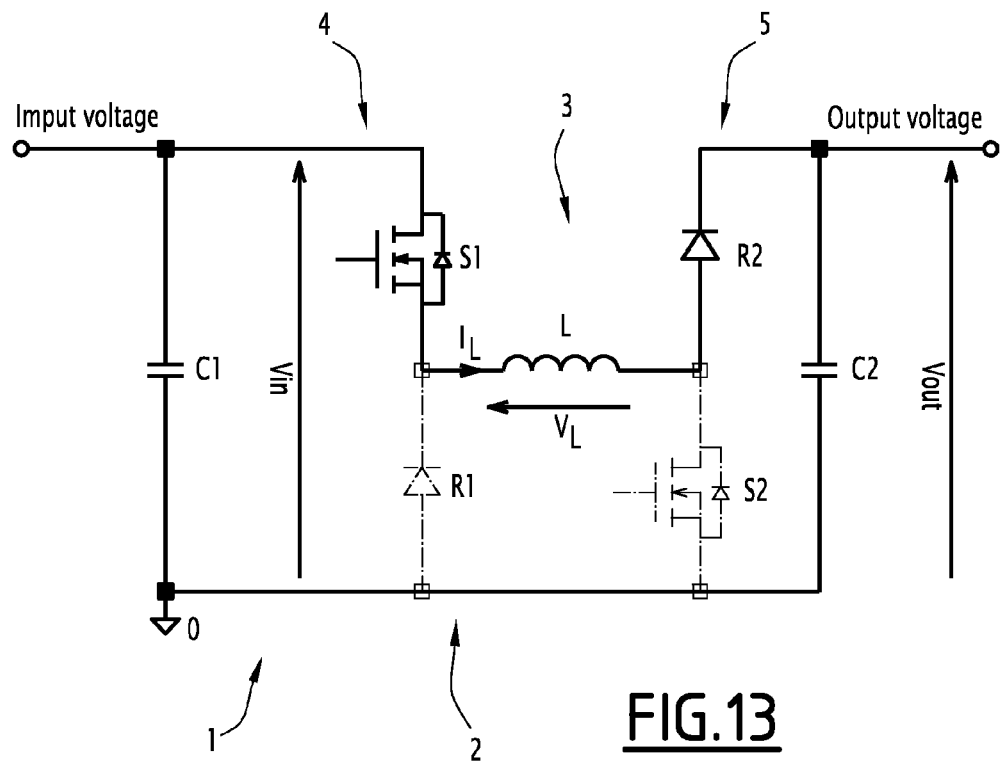
Figure 14:
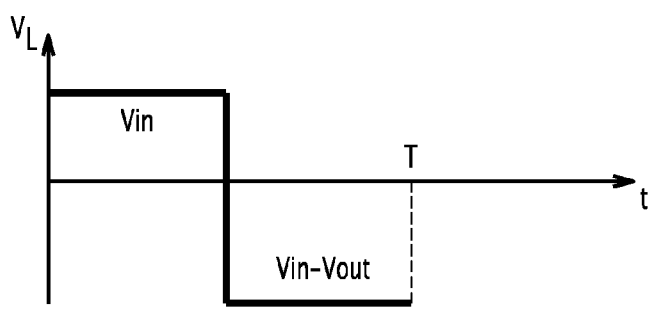
Figure 15:
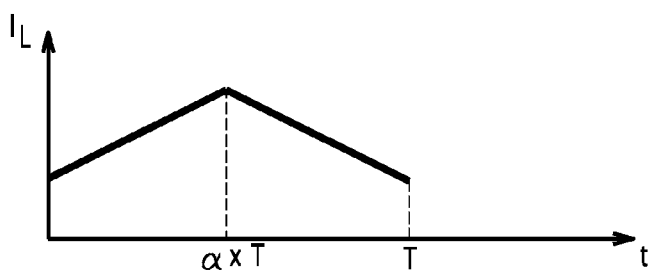

In phase β or the free-wheeling phase, as illustrated in FIG. 13, the member S2 opens. Preventing any current discontinuity in the inductance L, the rectifier R2 becomes conductive. The voltage at the terminals of the inductance L becomes negative, equal to the value $V_L = V_{in} - V_{out}$, thereby causing the current passing through it to decrease as illustrated in FIGS. 14 and 15.

If $\alpha_{boost}$ refers to the cyclic control ratio of the member S2, we then have the following relationship between the output voltage and the input voltage:

$$V_{out} = \frac{V_{in}}{\alpha_{boost}}$$

The transformer then increases the input voltage.

The third operating mode of the system is the "buck-boost" mode.

This is obtained by controlling the members S1 and S2 in the same way The continuous flow operation of such a structure is also broken down into two phases with a total duration called T, chopping period, i.e. a first phase α or charge phase, and a second phase β or free-wheeling phase.

Figure 16:
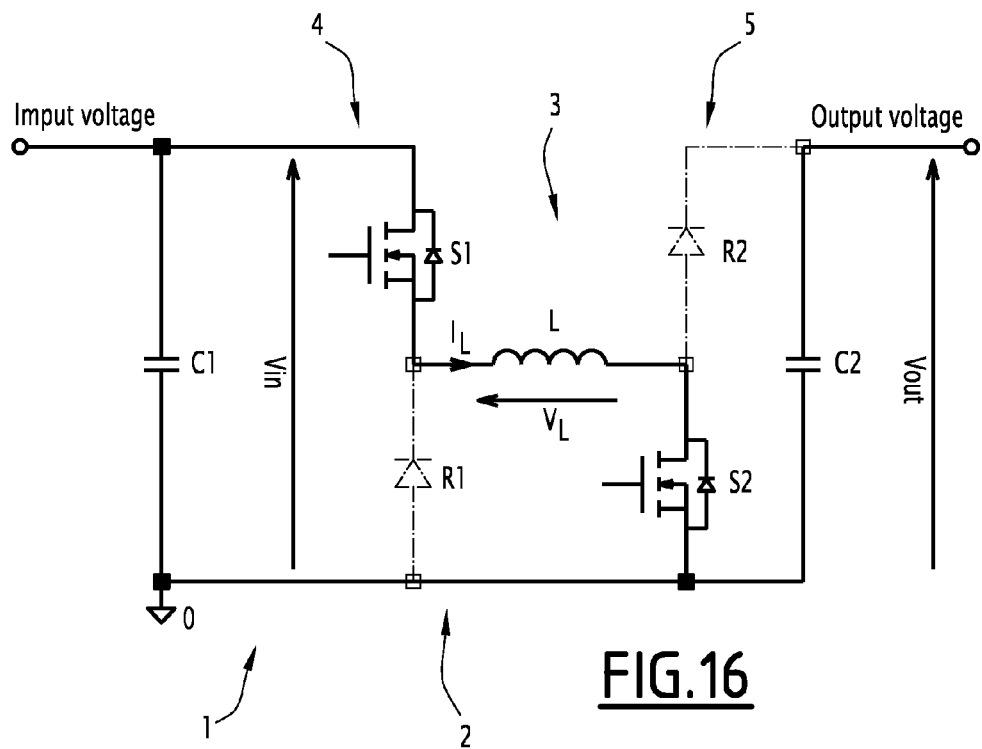
FIGS. 16 to 21 illustrate the operation of said system in buck/boost mode.
Figure 17:
Figure 18:

During the charge phase illustrated in FIG. 16, the members S1 and S2 conduct, forcing the voltage at the terminals of the inductance L to the value $V_L = V_{in}$. This voltage being positive, the current in the inductance increases linearly as a function of time, as illustrated in FIGS. 17 and 18.

Figure 19:
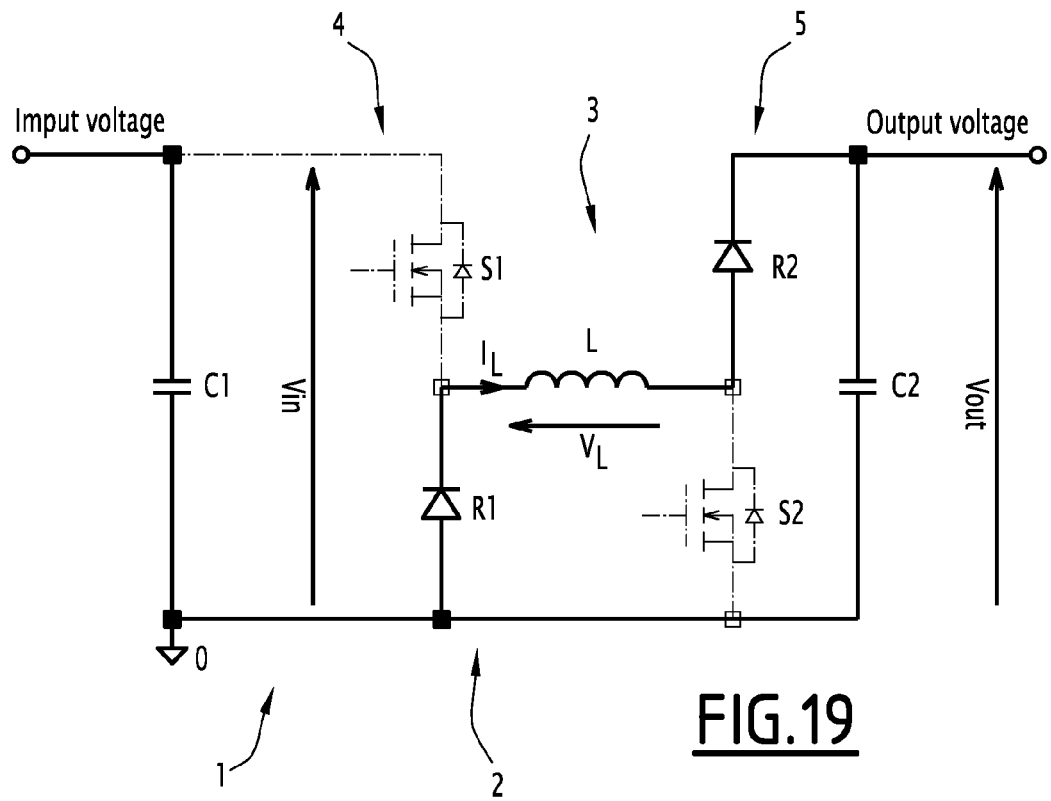
Figure 20:
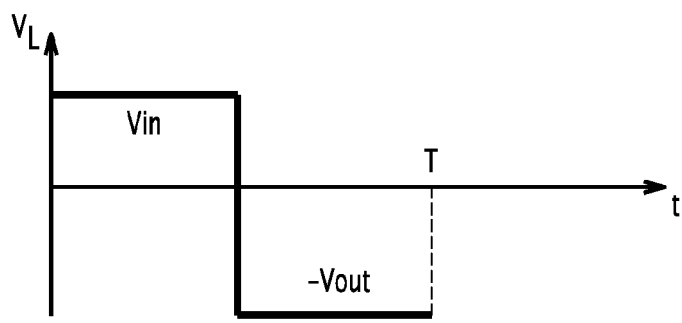
Figure 21:
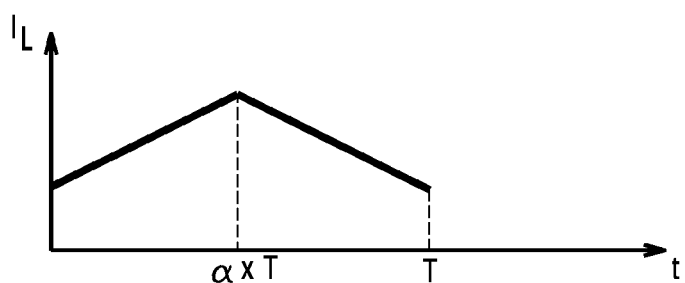

During the free-wheeling phase, as illustrated in FIG. 19, the members S1 and S2 open. Preventing any current discontinuity in the inductance L, the rectifiers R1 and R2 become conductive. The voltage at the terminals of the inductance L become negative, equal to the opposite of the output voltage, thereby causing the current passing through it to decrease as illustrated in FIGS. 20 and 21.

If $\alpha_{buck-boost}$ refers to the cyclic control ratio of the members S1 and S2, we have the following relationship between the output voltage and the input voltage:

$$V_{out} = V_{in} \alpha_{buck-boost} / [1 - \alpha_{buck-boost}]$$

The transformer raises or lowers the input voltage depending on whether one respectively has $\alpha_{buck-boost} \geq 0.5$ or $\alpha_{buck-boost} \leq 0.5$.

If the input dynamics of the transformer require that it must raise or lower the voltage, the solution is therefore to control the transformer in buck-boost mode.

Figure 22:
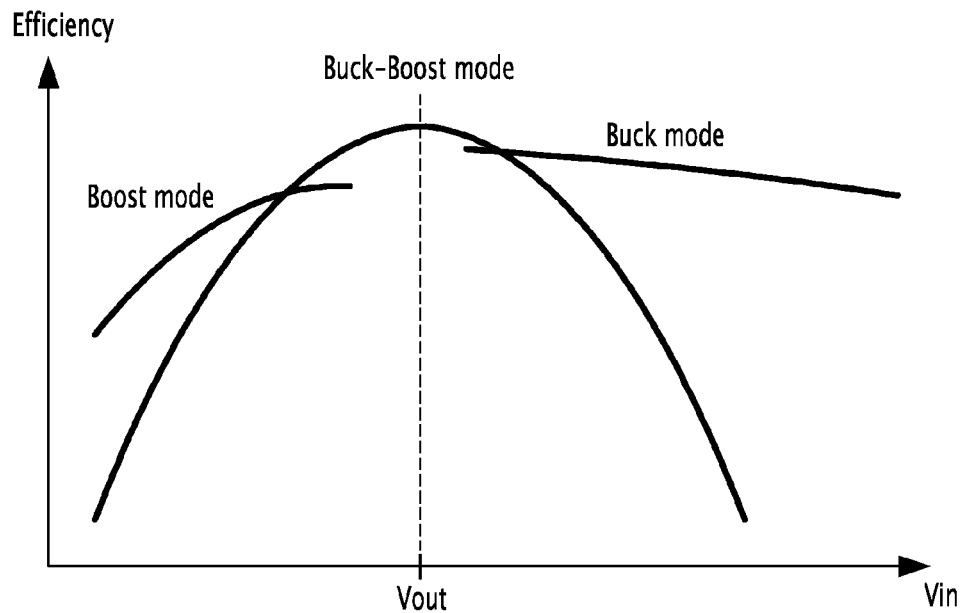
FIG. 22 illustrates the output of such a structure.

However, the optimal output of such a control is when the input voltage is close to the output voltage, as illustrated in FIG. 22.

Figure 23:
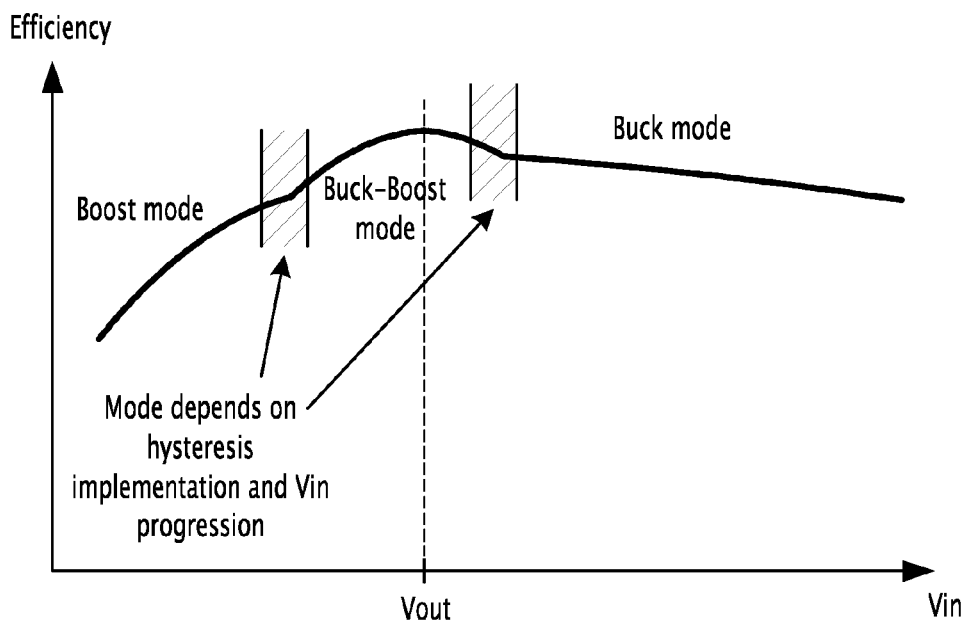
FIG. 23 illustrates the passage between different operating modes as implemented in a power supply system of the state of the art.

In the state of the art, the solution consists for example of monitoring the voltage difference between the input and the output and switching the control law so as to have the most suited possible law, i.e. in buck mode, boost mode, or buck/ boost mode, which makes it possible to obtain an optimal output as illustrated in FIG. 23.

Such a control is already implemented in commercial controllers such as, for example, the LINEAR TECHNOLOGY LTC3780 controller.

However and as previously indicated, this solution has a certain number of drawbacks in terms of latent breakdowns that may not be detected and risks of discontinuity instability related to the passage from one operating mode to another.

To resolve these problems and in the power supply system according to the invention, it is proposed to control the members S1 and S2 independently and continuously, as a function of the system's input and output voltages.

Figure 24:
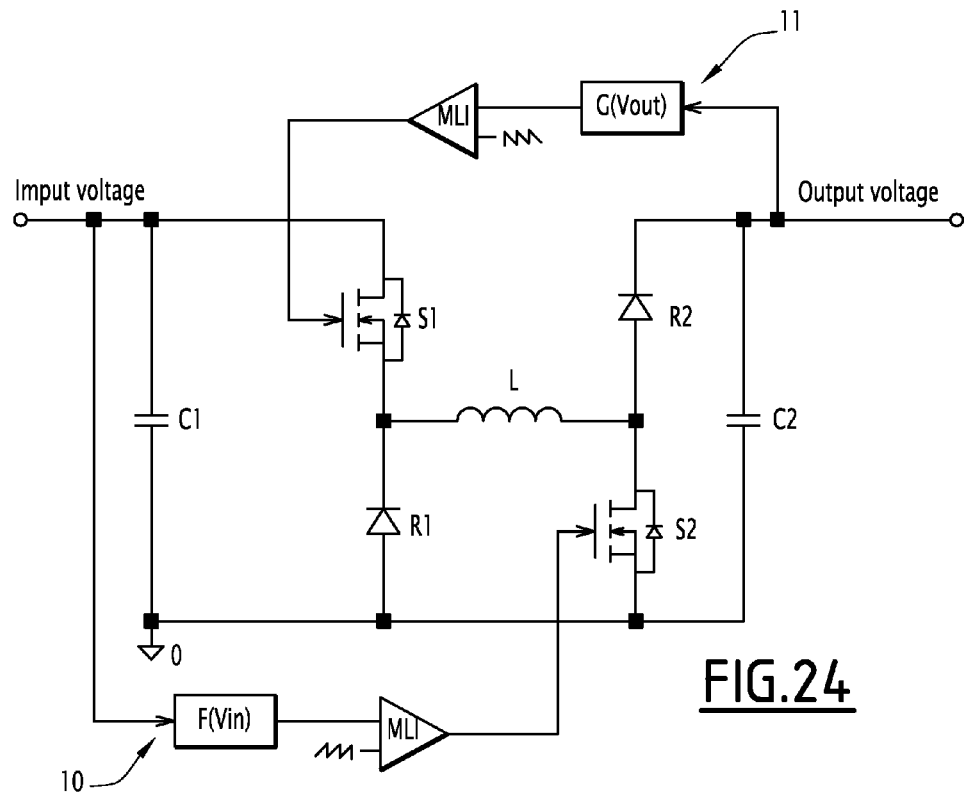
FIG. 24 illustrates an overview diagram illustrating a first embodiment of a power supply system according to the invention.

This is for example illustrated in FIG. 24, where one will recognize the elements already previously described, i.e. the capacitive members C1, C2, the rectifiers R1, R2, the shared inductance L and the controllable semiconductor switching members S1 and S2.

In fact in the system according to the invention, one of these controllable semiconductor switching members is driven by control means as a function of the system's input voltage, and the other is driven by enslavement means on the output voltage.

Thus for example and as illustrated in FIG. 24, the member S2 can be driven by control means, designated by general reference 10, as a function of the input voltage of the system while the member S1 can be driven by enslavement means on the output voltage as designated by general reference 11.

This FIG. 24 then describes a first solution that consists of controlling the member S1, i.e. the buck member as a function of the output voltage and the member S2, i.e. the boost member, as a function of the input voltage.

Figure 25:
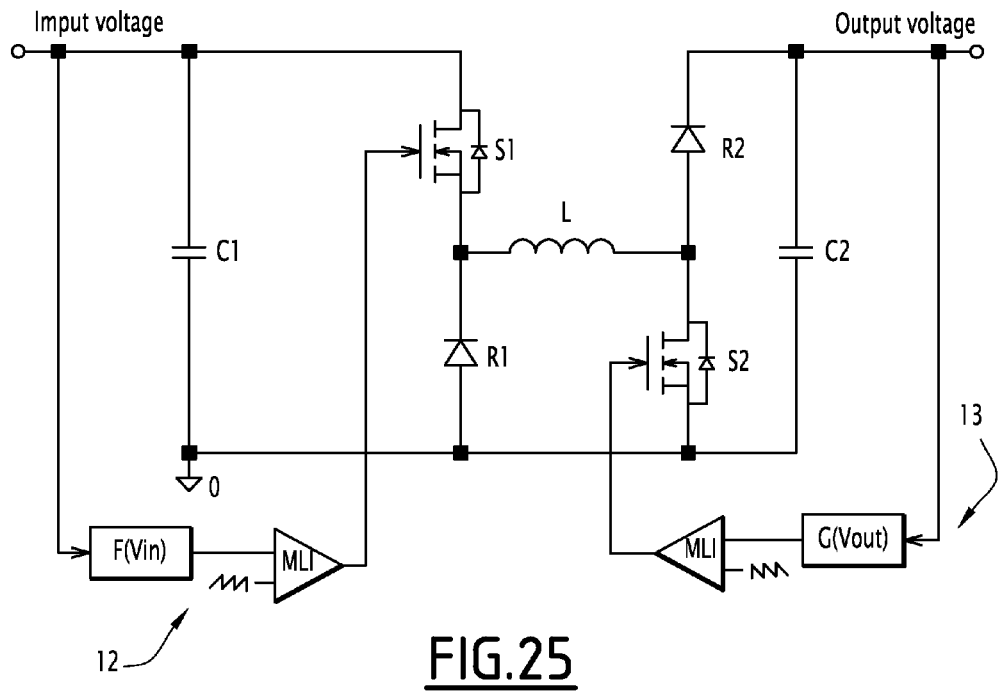
FIG. 25 illustrates an overview diagram of an alternative embodiment of a power supply system according to the invention.

However and as illustrated in FIG. 25, the opposite can also be considered, i.e. the member S1, the buck member, can also be driven by control means as a function of the input voltage of the system designated by general reference 12 in this figure and the member S2, i.e. the boost member, can be driven by enslavement means on the output voltage, as designated by general reference 13 in FIG. 25.

Hereafter $\alpha_{S1}=\alpha_{buck}$ will refer to the cyclic control ratio of the member S1 and $\alpha_{S2}=\alpha_{boost}$ the cyclic control ratio of the member S2.

The function G ($V_{out}$) making it possible to adjust the output voltage can be an error corrector relative to an output voltage reference for example made up of an analog corrector of the P, PI or RID type or a digital or other corrector.

The choice of the function F ($V_{in}$) making it possible to control the other member directly conditions the operating points of the assembly. In fact, in continuous flow, the relationship connecting the input and output voltages of the assembly, with the cyclic control ratios of the members, is:

$$V_{out} \times (1-\alpha_{boost}) = V_{in} \times \alpha_{buck}.$$

The PWM (pulse width modulation) control function controlling the semiconductor switching member, from the results of the preceding functions, can for example be done with:
 either voltage mode control, the resulting cyclic ratio then being directly proportional to the reference,
 or current mode control (peak, middle or valley), the current in the switch then being proportional to the reference.

The two pulse width modulation control blocks can then use identical or different chopping frequencies (whole submultiples or not), and may or may not be synchronized.

To adapt the output of the structure to low charges, pulse skipping or burst mode techniques can also be applied to the control of the members S1 or S2 or the other rectifiers if they are controllable.

Figure 26:
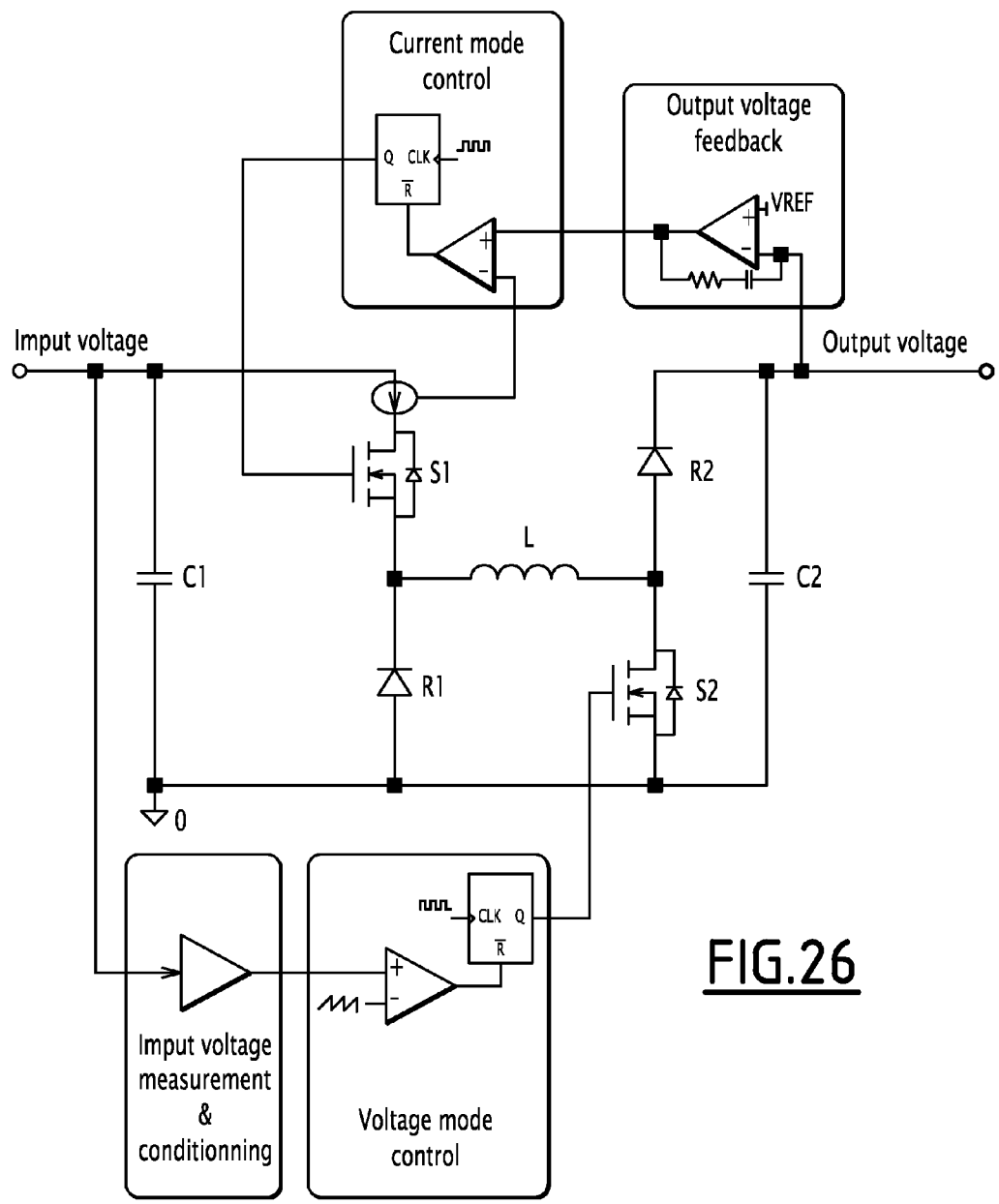
FIG. 26 illustrates an overview diagram of an example of the application of a power supply system according to the invention.

FIG. 26 provides an embodiment implemented on an avionics power supply module.

In this case, the member S1 is controlled with peak current enslavement on the output voltage of the transformer while the member S2 is controlled by the affine law as a function of the input voltage.

In this embodiment, the two members S1 and S2 chop at the same frequency, and they are synchronized and in phase.

The adjustment of the open-loop control $\alpha_{boost}$ of the member S2 conditions the control $\alpha_{buck}$ resulting from the closed loop of the output voltage of the transformer according to the relationship:

$$V_{out} \cdot (1-\alpha boost) = V_{in} \cdot \alpha_{buck}.$$

Figure 27:
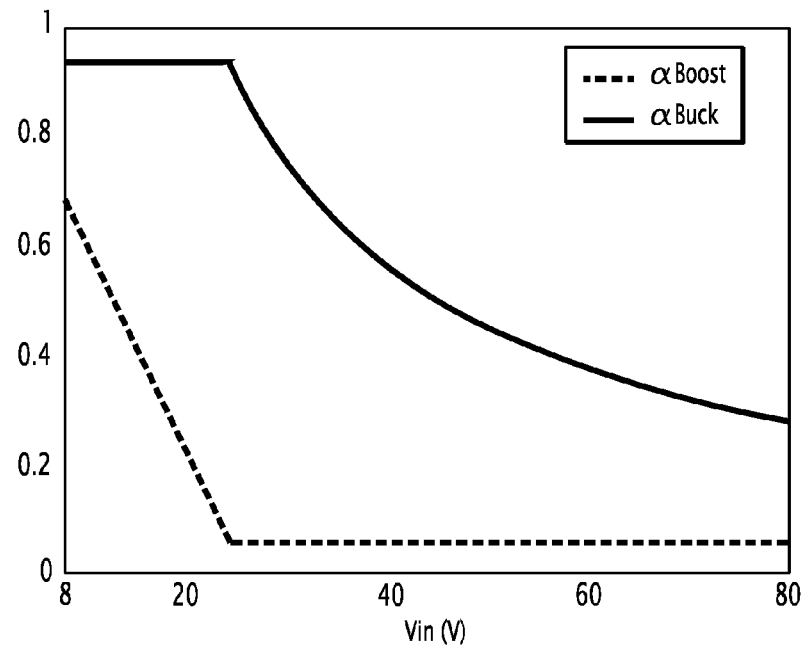
FIG. 27 illustrates the relationship of the input and output commands of a power supply system according to the invention.

The graph shown in FIG. 27 illustrates this relationship for a transformer with high input voltage dynamics, for example from 8 to 80 volt direct current to 24 volt direct current.

One can than see that such a structure has a certain number of advantages. In fact, there is no operating mode discontinuity and this system is much simpler to implement than the solutions of the state of the art. In fact, there would only be a single control logic and no transitions to manage.

Such a system can also operate with a synchronous rectifier, i.e. in which the rectifiers R1 and/or R2 are controllable semiconductor switching members.

Furthermore in such a system, all of the power and control elements being active in all operating modes, there is also no possibility of a latent breakdown.

Figure 28:
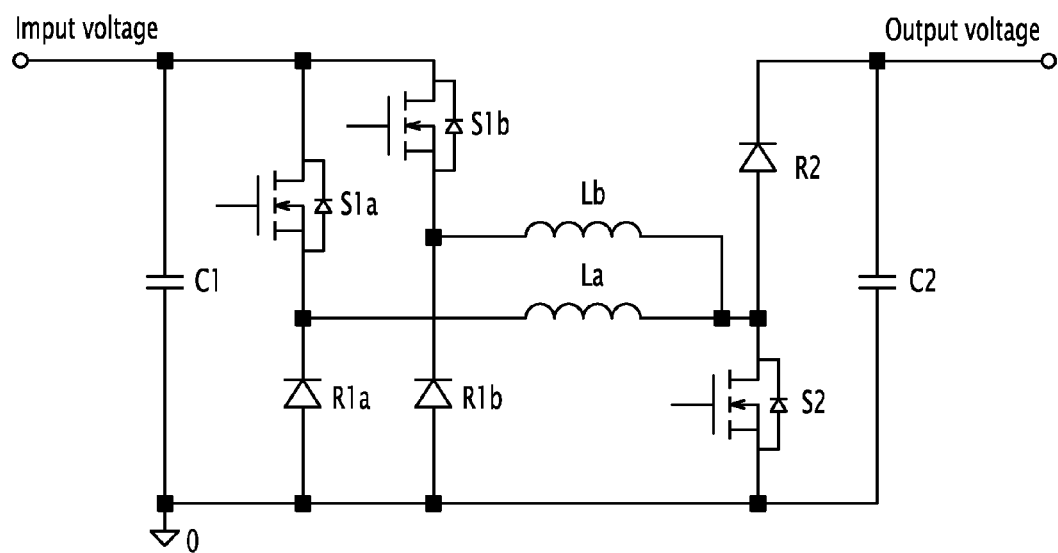
FIGS. 28 and 29 illustrate other possible alternatives of a power supply system according to the invention.
Figure 29:
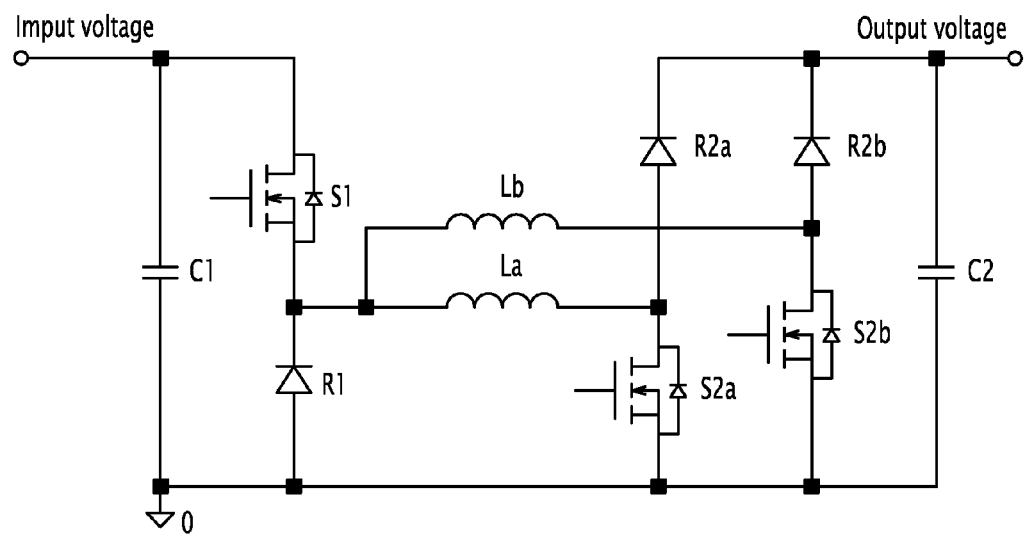

Lastly, such a system architecture can also be generalized to multi-phase structures using several inductances that may or may not be coupled and several buck/boost blocks as illustrated in FIGS. 28 and 29, on which multi-phase structures in input and output, respectively, are illustrated.

The invention claimed is:

1. A regulated power supply system with high input voltage dynamics, comprising:
 a shared inductance buck/boost transformer;
 at least two controllable semiconductor switching members, one associated with the buck function of the transformer and the other with the boost function of the transformer,
 wherein one of the controllable semiconductor switching members is driven continuously using a controller as a function of the system's input voltage, and the other is driven continuously by an enslavement device on the output voltage, and
 wherein the controller and the enslavement device of the controllable semiconductor switching members are active in all operating modes of the regulated power supply system, and
 wherein cyclic control ratios, $\alpha_{buck}$ and $\alpha_{boost}$ of the switching members of the power supply system are above 0 and below 1 in all operating modes of the system.

2. The regulated power supply system with high input voltage dynamics according to claim 1, wherein the controllable semiconductor switching member driven by the controller as a function of the system's input voltage is the switching member associated with the buck function of the transformer.

3. The regulated power supply system with high input voltage dynamics according to claim 1, wherein the controllable semiconductor switching member driven by the controller as a function of the system's input voltage is the switching member associated with the system's boost function.

4. The regulated power supply system with high input voltage dynamics according to claim 1, wherein the controller, as a function of the system's input voltage, uses an affine function for controlling the corresponding member.

5. The regulated power supply system with high input voltage dynamics according to claim 1, wherein the enslavement device on the input voltage of the other member use an enslavement function on a set point.

6. The regulated power supply system with high input voltage dynamics according to claim 5, wherein the enslavement device comprises an analog corrector chosen from the group comprising a P,PI or PID corrector or a digital corrector.

7. The regulated power supply system with high input voltage dynamics according to claim 1, wherein the controller of the semiconductor switching members use controllers in voltage mode or in current mode.

8. The regulated power supply system with high input voltage dynamics according to claim 1, wherein the controller of the semiconductor switching members use positive and/or negative current limiters.

9. The regulated power supply system with high input voltage dynamics according to claim 1, wherein the controller of the semiconductor switching members uses a device that may or may not be independent, at different or identical frequencies, in phase or out of phase.

10. The regulated power supply system with high input voltage dynamics according to claim 9, wherein the controller controls by pulse skipping or burst mode.

* * * * *